US007684390B2

(12) United States Patent
Navada et al.

(10) Patent No.: US 7,684,390 B2
(45) Date of Patent: Mar. 23, 2010

(54) INTEGRATED CIRCUIT CAPABLE OF TRANSMITTING PROBE PACKETS ACROSS A STACK OF SWITCHES

(75) Inventors: Muraleedhara Herur Navada, Santa Clara, CA (US); Hitesh Rastogi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1358 days.

(21) Appl. No.: 11/027,857

(22) Filed: Dec. 30, 2004

(65) Prior Publication Data

US 2006/0146723 A1 Jul. 6, 2006

(51) Int. Cl.
 *H04L 12/56* (2006.01)
(52) U.S. Cl. ..................................... 370/389
(58) Field of Classification Search .................. 370/251
 See application file for complete search history.

(56) References Cited

U.S. PATENT DOCUMENTS

| | | | |
|---|---|---|---|
| 5,835,537 A * | 11/1998 | Ichii et al. ................... | 375/295 |
| 5,872,904 A | 2/1999 | McMillen et al. | |
| 5,999,531 A | 12/1999 | Ferolito et al. | |
| 6,049,542 A | 4/2000 | Prasad | |
| 6,185,214 B1 * | 2/2001 | Schwartz et al. ............. | 370/401 |
| 6,353,612 B1 * | 3/2002 | Zhu et al. .................... | 370/360 |
| 6,366,563 B1 * | 4/2002 | Weldon et al. .............. | 370/252 |
| 6,460,088 B1 * | 10/2002 | Merchant .................... | 709/236 |
| 6,484,209 B1 | 11/2002 | Momirov | |
| 6,603,772 B1 | 8/2003 | Moussavi et al. | |
| 6,643,294 B1 | 11/2003 | Cooperman et al. | |
| 6,717,914 B1 * | 4/2004 | Hamami ..................... | 370/248 |
| 6,778,547 B1 * | 8/2004 | Merchant .................... | 370/422 |
| 6,813,268 B1 | 11/2004 | Kalkunte et al. | |
| 6,988,170 B2 * | 1/2006 | Barroso et al. .............. | 711/141 |
| 7,027,437 B1 * | 4/2006 | Merchant et al. ............ | 370/389 |
| 7,058,053 B1 | 6/2006 | Schober | |
| 7,230,949 B2 * | 6/2007 | Bharali et al. ............ | 370/395.2 |
| 7,277,426 B2 * | 10/2007 | Brown ........................ | 370/383 |
| 7,489,683 B2 | 2/2009 | Navada | |
| 2002/0126669 A1 | 9/2002 | Tuck et al. | |

(Continued)

FOREIGN PATENT DOCUMENTS

CN 1770745 A 5/2006

(Continued)

OTHER PUBLICATIONS

"802.3 IEEE Standard for Information Technology, Table of Contents", Telecommunications and information exchange between systems- Local and metropolitan area networks- Specific requirements, Part 3: Carrier sense multiple access with collision detection (CSMA/CD) access method and physical layer specifications (Mar. 08, 2002),387 pgs.

(Continued)

*Primary Examiner*—Anh-Vu Ly
(74) *Attorney, Agent, or Firm*—Grossman, Tucker, Perreault & Pfleger, PLLC

(57) ABSTRACT

A method according to one embodiment may include communicating with at least one external device using at least one port, said at least one external device comprises at least one probe port. The method of this embodiment may also include receiving at least one data packet and generating at least one probe packet. The method of this embodiment may further include generating at least one probe packet device vector and transmitting the probe packet and the probe packet device vector to at least one probe port of at least one external device via at least one port. Of course, many alternatives, variations, and modifications are possible without departing from this embodiment.

12 Claims, 11 Drawing Sheets

U.S. PATENT DOCUMENTS

| | | | |
|---|---|---|---|
| 2003/0048785 A1* | 3/2003 | Calvignac et al. | 370/392 |
| 2003/0174725 A1 | 9/2003 | Shankar | |
| 2003/0231631 A1* | 12/2003 | Pullela | 370/392 |
| 2004/0008711 A1* | 1/2004 | Lahti et al. | 370/428 |
| 2004/0022245 A1* | 2/2004 | Forbes et al. | 370/392 |
| 2004/0156383 A1 | 8/2004 | Nakagawa et al. | |
| 2005/0141502 A1 | 6/2005 | Kumar et al. | |
| 2006/0069805 A1* | 3/2006 | LeBlanc et al. | 709/245 |
| 2006/0072571 A1 | 4/2006 | Navada et al. | |

FOREIGN PATENT DOCUMENTS

| | | |
|---|---|---|
| WO | 0115393 A1 | 3/2001 |
| WO | 02093836 A1 | 11/2005 |
| WO | 2006039620 A1 | 4/2006 |

OTHER PUBLICATIONS

Search Copy; Dated Dec. 6, 2005; PCT/US2005/035416, 1 page.

Boivie, R. et al., "Explicit Multicast (XCAST) Basic Specification", http:http://www.watersprings.org/pub/id/draft-ooms-xcast-basic-spec-05.txt, (Aug. 2003),1 page.

The ATM Forum Technical Committee, ATM-MPLS Network Interworking, Version 1.0, (Aug. 2001), 23 pgs.

Non-Final Office Action dated Oct. 4, 2007 for U.S. Appl. No. 10/953,083. 9 pages.

Notice of Allowance Received for U.S. Appl. No. 10/953,083, mailed on Sep. 19, 2008. pp. 7.

Notice of Allowance Received for U.S. Appl. No. 10/953,083, mailed on May 21, 2008. pp. 8.

International Search Report or Written Opinion received for PCT Patent Application No. PCT/US2005/035416, mailed on Feb. 21, 2006. pp. 11.

International Preliminary Report on Patentability for PCT Application No. PCT/US2005/035416, mailed on Apr. 12, 2007. pp. 7.

Office Action received for Chinese Patent Application No. 200580033137.6 mailed on Dec. 19, 2008, 5 pages and English translation of 8 pages.

* cited by examiner

DRAT OF DEVICE 3

| DEVICE NUMBER | STACKED PORT NUMBER ||||||||||||
| --- | --- | --- | --- | --- | --- | --- | --- | --- | --- | --- | --- | --- |
| | WAY0 | WAY1 | WAY2 | WAY3 | WAY4 | WAY5 | WAY6 | WAY7 | WAY8 | WAY9 | WAY10 | WAY11 |
| 0 | | | | | | | | | | | | |
| 1 | 4 | 4 | 4 | 4 | 4 | 4 | 4 | 4 | 4 | 4 | 4 | 4 |
| 2 | 5 | 5 | 5 | 5 | 5 | 5 | 6 | 6 | 6 | 6 | 6 | 6 |
| 3 | | | | | | | | | | | | |
| 4 | 5 | 5 | 5 | 5 | 5 | 5 | 6 | 6 | 6 | 6 | 6 | 6 |
| 5 | 4 | 4 | 4 | 4 | 4 | 4 | 4 | 4 | 4 | 4 | 5 | 6 |
| 6 | | | | | | | | | | | | |
| 7 | | | | | | | | | | | | |
| 8 | 4 | 4 | 4 | 4 | 4 | 4 | 4 | 4 | 4 | 4 | 5 | 6 |

INTEGRATED CIRCUIT CAPABLE OF TRANSMITTING PROBE PACKETS ACROSS A STACK OF SWITCHES

FIELD

The present disclosure relates to an integrated circuit capable of transmitting probe packets across a stack of switches.

BACKGROUND

In one conventional network arrangement, a switch is used to permit communication and data exchange between other switches and computer nodes coupled to the switch. The switch may have a plurality of ports, each port coupled to a switch or more computer nodes. Arriving packets are routed to one or more ports via a routing mechanism. Multiple switches may be stacked together to provide additional network connectivity for additional computer nodes. In some instances, one or more packets may be probed. In order to support packet probing, in the conventional network arrangement, each switch must be capable of packet probing since the conventional network arrangement lacks the ability to transmit probe packets across one or more switches in a stack, and thus, the conventional storage cannot provide unified packet probing in a stack of switches.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 3 is a diagram illustrating an exemplary device reachability table according to one embodiment;

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
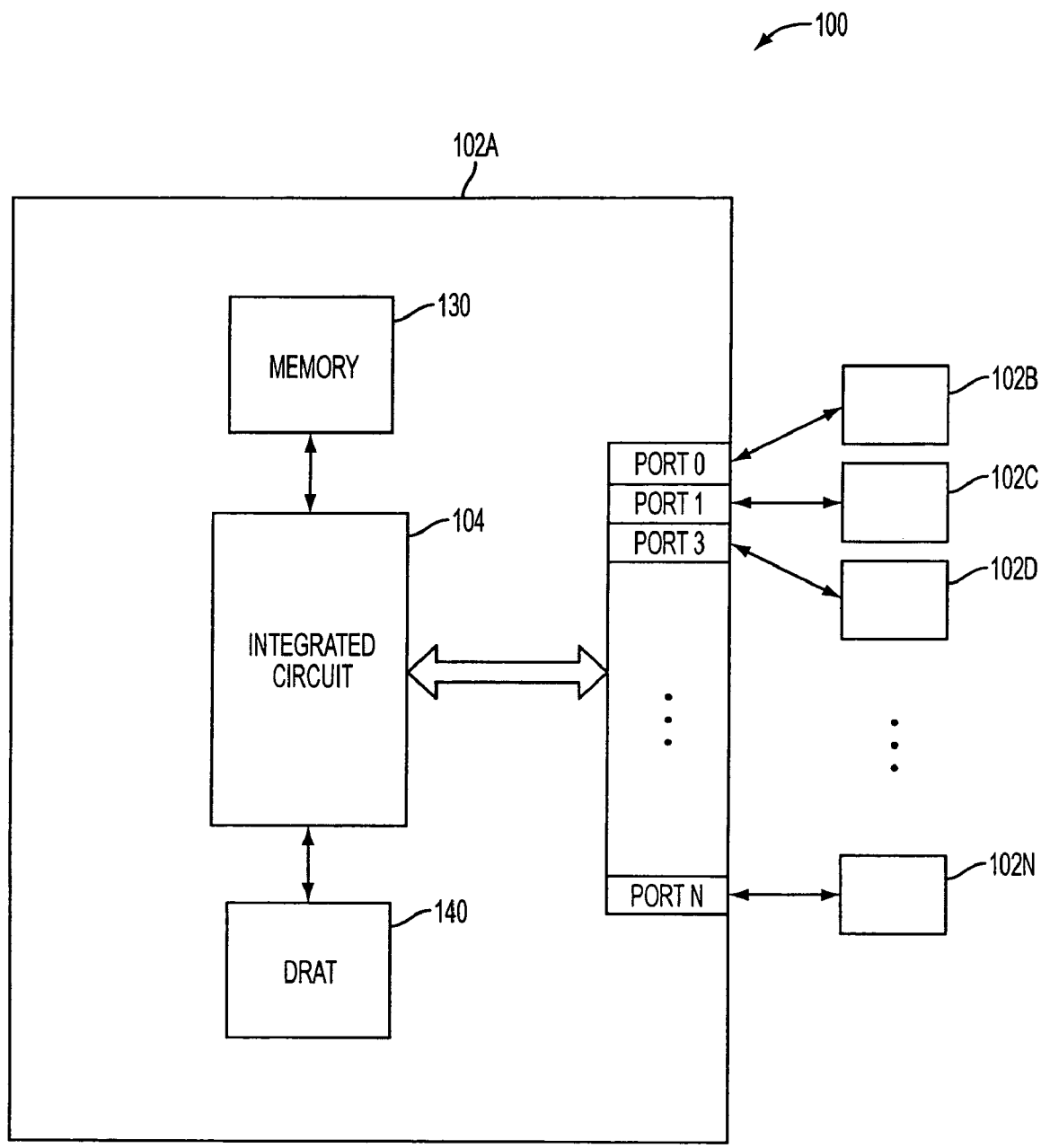
FIG. 1 is a diagram illustrating a system embodiment.

FIG. 1 illustrates a system embodiment 100 of the claimed subject matter. The system 100 may generally include a switch 102A, which may be capable of communicating with one or more external devices designated as 102B, 102C, 102D . . . 102N. A "device" or "devices" as used in any embodiment herein may comprise, singly or in combination, for example, but not limited to, a switch, a router, a computer node element and/or probing instruments. The term "switch" (e.g., switch 102A), as used in any embodiment herein, may be defined as a device capable of receiving one or more data packets from one or more devices and/or transmitting one or more data packets to one or more devices.

It should be noted at the outset that while the following detailed description shall proceed with reference to the switch 102A, it may be assumed that if devices 102B, 102C, 102D . . . 102N each comprise one or more switches in communication with switch 102A, then these devices may operate in a similar manner as switch 102A. Switch 102A may also be capable of communicating with one or more network node elements, for example, but not limited to, computer node elements (not shown).

Switch 102A may comprise an enclosure that includes an integrated circuit 104, a memory 130, a device reachability table (DRAT) 140 and a plurality of ports 0, 1, 2 . . . N, the details of which will be provided more fully below. As used in any embodiment herein, an "integrated circuit" means a semiconductor device and/or microelectronic device, such as, for example, but not limited to, a semiconductor integrated circuit chip. The memory 130 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, the memory 130 may comprise other and/or later-developed types of computer-readable memory. Machine readable firmware program instructions may be stored in the memory 130. These instructions may be accessed and executed by the integrated circuit 104. When executed by the integrated circuit 104, these instructions may result in the integrated circuit 104 performing the operations described herein as being performed by the integrated circuit.

System 100 may comprise a packet switched network. Switch 102A may be capable of communicating with one or more of devices 102B, 102C, 102D . . . 102N using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard," published in Mar. 2002 and/or later versions of this standard. Alternative or additionally, switch 102A may be capable of communicating with one or more of devices 102B, 102C, 102D . . . 102N using an X.25 communications protocol. The X.25 communications protocol may comply or be compatible with a standard promulgated by the International Telecommunication Union-Telecommunication Standardization Sector (ITU-T). Alternatively or additionally, switch 102A may be capable of communicating with one or more of devices 102B, 102C, 102D . . . 102N using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, switch 102A may be capable of communicating with one or more of devices 102B, 102C, 102D . . . 102N using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed communications protocols are equally contemplated herein.

Referring to FIG. 1, ports 0, 1, 2 ... N of the switch 102A may each comprise a client port and/or a stacked port and/or a probe port. A port may comprise a physical interface capable of coupling one device to another device. As used herein, a "stacked port" may be defined as port used to couple a switch to another switch. A "client port", as used herein, may be defined as a port used to couple a switch to a network and/or computer node element, i.e., a device other than a switch. A "probe port", as used in any embodiment herein, may be defined as a port to which probing instruments may be connected. Probing instruments may include, for example, port sniffers, network diagnostic tools, and/or other instruments capable of receiving and/or analyzing a probe packet. If one or more devices 102B, 102C, 102D, ..., 102N comprise a switch, than the switch 102B, 102C, 102D, ..., and/or 102N may also include one or more client ports, stacked ports and/or probe ports. In at least one exemplary embodiment described herein, the integrated circuit 104 may be capable of replicating at least one data packet and routing at least one data packet to a probe port. Further, in at least one exemplary embodiment, the integrated circuit described herein may also be capable of routing one or more data packets to another switch coupled to a stacked port and/or another device coupled to client port. A "packet," as used in any embodiment herein, may comprise a sequence of symbols.

Figure 2:
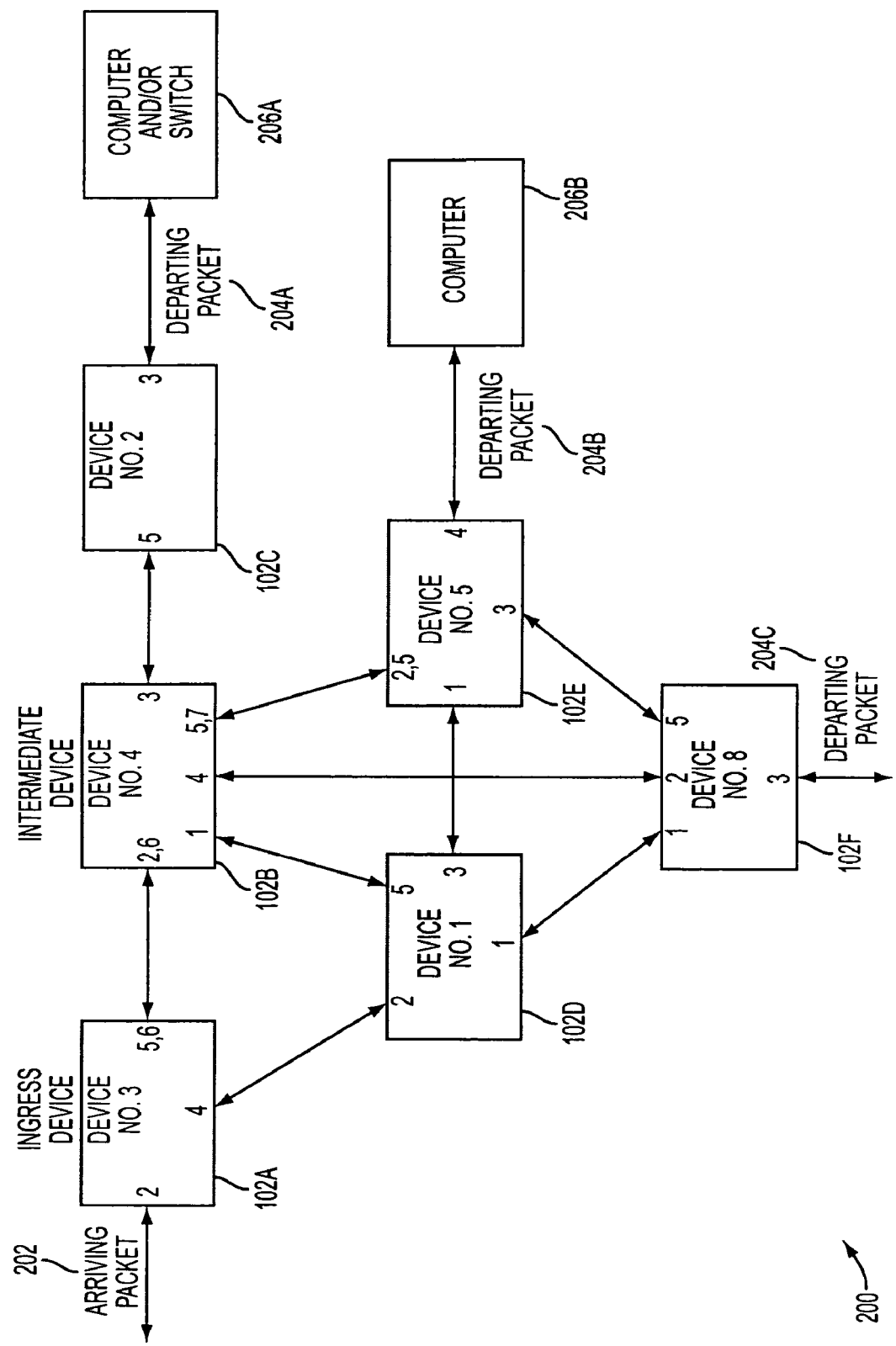
FIG. 2 is a diagram illustrating a plurality of switches in a stacked switch system.

Before describing in detail exemplary structures of the switch 102A and the integrated circuit 104, a brief overview of stacked switches and packet transport among stacked switches is provided below. As stated, the switch 102A may be capable of communicating with other switches via one or more stacked ports. A plurality of switches may be coupled together in a stack of switches. FIG. 2 illustrates an exemplary switch stack 200. The switch stack 200 may include a plurality of devices 102A, 102B, 102C, 102D, 102E, and 102F, and the switch stack 200 may represent a complete stacked arrangement of switches or an exemplary subset thereof. The details of the switch 102A (depicted in FIG. 1) have been omitted for clarity in FIG. 2. Each of the devices in the switch stack 200 may be capable of communicating with other switches, either directly or via other switches.

A switch stack may be operable to bring a plurality of network node elements together to permit, for example, uniform administration of switches and/or an increased number of available network node elements. The collection of switches in the stack may be administered uniformly via a computer coupled to a client port of one of the switches. The collection of switches in the switch stack 200 depicted in FIG. 2 may operate as a single large switch. It should be understood at the outset that the particular topology of the switch stack 200 may be formed to support redundancy requirements and/or bandwidth requirements of a particular network environment but this topology is only exemplary, and thus, the present disclosure shall be construed as covering any topology of a stack of switches.

Each device in the switch stack 200 may also be capable of communicating with one or more other devices, either directly or via other devices in the stack, for example, but not limited to computer node elements 103A, 103B. For example, referring to FIG. 2, an arriving packet 202 depicted on port 2 of the switch 102A may be generated by a computer node element. Alternatively or additionally, the arriving packet 202 may be transmitted by another switch not depicted in the switch stack 200. The arriving packet 202 may comprise a multicast packet. A "multicast packet" as used in any embodiment herein, for example, may comprise a packet that is to be replicated and forwarded to more than one device among a plurality of devices in the switch stack 200.

Referring again to FIG. 2, by way of example, the arriving packet 202 on port 2 of the switch 102A may comprise a multicast packet. The switch 102A may be capable of replicating the multicast packet and routing the multicast packet by forwarding copies of the multicast packet, via one or more ports, to one or more switches in the switch stack 200. One copy of the multicast packet may be sent to device 102D via port 4 and one copy of the multicast packet may be sent to device 102B via ports 5 and/or 6. Device 102B may comprise an intermediate device. An "intermediate device" may be defined as a device between two or more devices. Device 102D may also be capable of routing the received packet on port 2 to device 102F (via port 1). Device 102F may be capable routing the departing packet 204C via port 5. The departing packet leaving device 102F may be destined for a computer node and/or another switch (not shown). Similarly, device 102B may also be capable of routing a copy of the packet to device 102E via ports 5 and/or 7. Device 102E may be capable of routing the departing packet 204B via port 4 to, in this example, a computer node 206B. The departing packet 204A leaving device 102C may be destined for a computer node and/or another switch 206B.

Of course, the preceding description is only provided as an example, and it is intended that the switch 102A of the present disclosure may be capable of routing packets to one or any combination of devices in a stack. To determine the appropriate packet routing, the switch 102A may comprise a device reachability table (DRAT) 140 (see FIG. 1). The DRAT may generally include one or more entries to determine which port or ports among a plurality of ports comprised in the switch 102A should be used to reach a target switch in the switch stack 200.

FIG. 3 depicts an exemplary DRAT 140 which may be comprised in the switch 102A, labeled as "DRAT of Device No. 3" (corresponding to Device No. 3 in FIG. 2). The first column 302 of the DRAT 140 may include one or more device numbers, for example, device numbers 0 through 8. "Device" as used in reference to the DRAT 140 may include a desired target device in a stack of switches.

A plurality of Ways 304 may be defined in the DRAT 140. For example, the DRAT 140 may include Way0, Way1, Way2 ... Way11. Each Way may designate a port used to reach a target device. For example, the row for target device 1 306 shows that each of the Ways (Way0-Way11) designates the use of port 4 to reach target device 1. The row for target device 2 308 depicts that Way0-Way5 designates the use of port 5, and Way6-Way11 designate the use of port 6 to reach target device 2. The port or ports designated by each Way (Way0-Way11) may represent a random selection of ports. Alternatively, ports may be designated based on, for example, the bandwidth of a port. Thus, for example, in the row for target device 5 310, port 4 is designated by Way0-Way 9, port 5 is designated by Way10 and port 6 is designated by Way11. This may reflect, for example, a condition in which port 4 of device 3 has more bandwidth than either port 5 or port 6.

The number of rows in the DRAT 140 may represent the number of devices in a switch stack. In this example, device 0, device 6, and device 7 may be unreachable or otherwise unavailable to switch 3. Thus, the rows corresponding to these switches may have null entries. In operation, the integrated circuit 104 may select one or more ports for forwarding a data packet by generating a random number to select a way comprised in the DRAT 140.

Referring again to FIG. 1, the DRAT 140 may be stored in memory, such as memory 130 or other memory (not shown). The integrated circuit 104 comprised in the switch 102A may be capable of determining the number and/or availability of devices in a switch stack in which the switch 102A may be used. The integrated circuit 104 may also be capable of determining the availability and/or performance of one or more ports comprised in the switch 102A. The integrated circuit 104 may be capable of updating and/or creating the DRAT 140 to reflect current conditions in the switch stack and/or the ports of the switch 102A. Alternatively, or additionally, a computer node element (not shown) coupled to the switch 102A may be capable of interrogating the switch 102A and/or one or more devices in a switch stack in which switch 102A is used, and may determine information to update and/or create the DRAT 140. A computer node element may have administrative control over all members in a switch stack, or subset thereof, and may be capable of updating and/or creating a DRAT associated with other switches in the switch stack.

Figure 4:
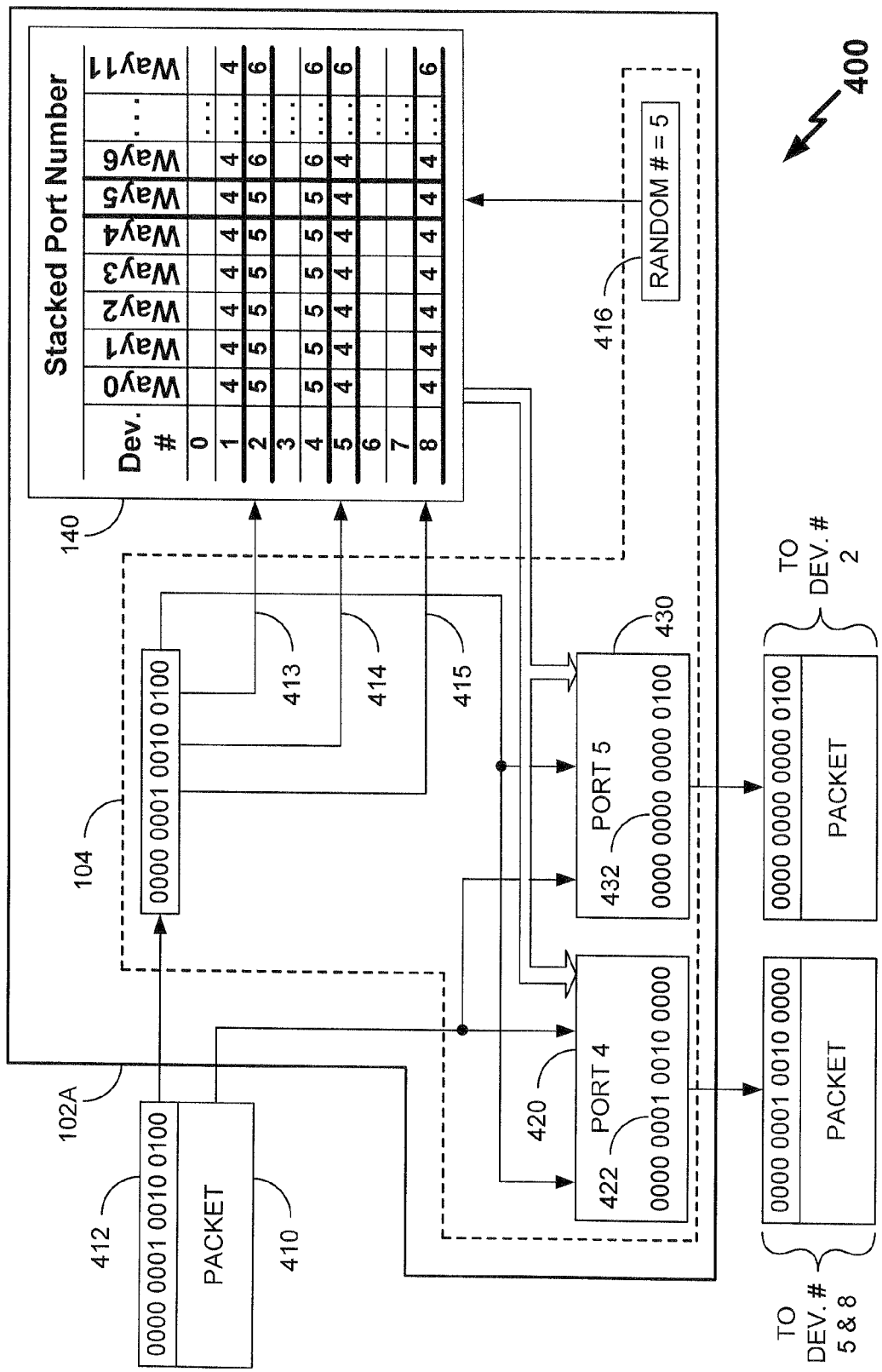
FIG. 4 is a simplified illustration of device vector forwarding operations.

FIG. 4 is an illustration of device vector forwarding operations of the integrated circuit 104. Referring again to FIG. 2 in conjunction with FIG. 4, the integrated circuit 104 comprised in the switch 102A may be capable of receiving one or more packets from one or more ports comprised in switch 102A, and/or transmitting one or more data packets to one or more ports comprised in switch 102A. In at least one embodiment herein, integrated circuit 104 may be capable of generating one or more device vectors, and/or receiving one or more device vectors from another switch. A device vector may be operable to route one or more packets to one or more switches in the switch stack 200. As used herein, "device vector" may be defined as a superset of symbols representing each device for which a multicast packet is intended for replication.

In an exemplary embodiment, a device vector 412 may include a sequence of bits, each bit representing a switch in a given stack. The device vector 412 may specify one or more target devices that should receive a replication of the multicast packet 410 and may represent a superset of all device vectors that may be associated with each replication of the multicast packet 410. The device vector 412 may originate from another device, such as another switch external to the integrated circuit 104. Alternatively, the integrated circuit 104 may comprise device vector generator circuitry (not shown), which may be capable of generating a device vector 412 to route a multicast data packet 410 to one or more target devices. Based on an identified port number and the original device vector 412, the integrated circuit 104 may be capable generating at least one new device vector, and may be capable of transmitting the new device vector and the multicast packet 410 directly to the identified port.

The operations of FIG. 4 are generally directed to operations of the switch 102A in the switch stack 200 shown in FIG. 2. For the operations of FIG. 4, assume that the switch 102A receives a multicast packet 410, and that the multicast information provides for a replication of the packet to Devices 2, 5 and 8 in the switch stack 200.

The integrated circuit 104 may generate, or may receive from another source, a device vector 412 of the form 0000_0001_0010_0100. In this example, each bit in device vector 412 may represent a device in the switch stack 200. The least significant bit may represent Switch 0, and the most significant bit may represent Switch 15. Thus, in this example, there may be 16 switches in the stack of switches, and Switches 2, 5, and 8 may be selected to receive replications of the packet 410. The integrated circuit 104 (or other circuitry, not shown) may be capable of generating a random number 416. In this example, the random number 416 may comprise a whole number corresponding to the number of Ways defined in the DRAT 140. Thus, for example, the random number 416 may be a whole number from 0 to 11.

Based on, at least in part, the random number 416, the integrated circuit 104 may be capable of generating a port number corresponding to the Way in the DRAT 140. For example, a random number 416 equal to 5 may correspond to Way5 in the DRAT 140. Accordingly, the integrated circuit 104 may select the port corresponding to Way5 in the DRAT 140 for each switch represented in the device vector 412. In this example, the random number 416 is 5 and bit 2, corresponding to reference numeral 413 of the device vector 412 is set, therefore the integrated circuit 104 may select port 5, corresponding to reference numeral 430 (corresponding to Way5). Likewise, since bits 5, corresponding to reference numeral 414 and 8, corresponding to reference numeral 415 of the device vector 412 are set, the integrated circuit 104 may select port 4, corresponding to reference numeral 420 to reach both Switch 5 and Switch 8. In this embodiment, the same random number 416 may be used for all operations of the integrated circuit 104 for a given device vector 412.

In this example, a new device vector may be generated for port 4, corresponding to reference numeral 420. Bits 5, corresponding to reference numeral 414 and 8, corresponding to reference numeral 415 of the device vector 412 may be set (i.e., equal to 1), selecting devices 5 and 8 to receive replications of the packet 410. The integrated circuit 104 may generate a new device vector 422 of the form 0000_0001_0010_0000 (i.e., with bits 5 and 8 set), indicating that the multicast packet may be targeted for devices 5 and 8 via port 4, corresponding to reference numeral 420. The multicast packet 410 and the new device vector 422 may be transmitted to devices 5 and 8, via port 4, corresponding to reference numeral 420, either directly or through one or more intermediate devices comprised in a stack of switches. If one or more intermediate switches are used, each switch may comprise similar circuitry and operate in a similar manner as described herein with reference to the switch 102A to route the multicast packet to at least one final destination.

A new device vector may also be generated for port 5, corresponding to reference numeral 430. Bit 2, corresponding to reference numeral 413 of the device vector 412 may be set, selecting device 2 to receive a replication of the packet 410. The integrated circuit 104 may generate a new device vector 432 of the form 0000_0000_0000_0100, indicating that the multicast packet may be targeted for device 2 via port 5, corresponding to reference numeral 430. The multicast packet 410 and the new device vector 432 may be transmitted to device 2 via port 5, corresponding to reference numeral 430, either directly or through one or more intermediate devices comprised in a stack of switches. If one or more intermediate switches are used, each switch may comprise similar circuitry and operate in a similar manner as described herein with reference to the switch 102A to route the multicast packet to at least one final destination.

Figure 5:
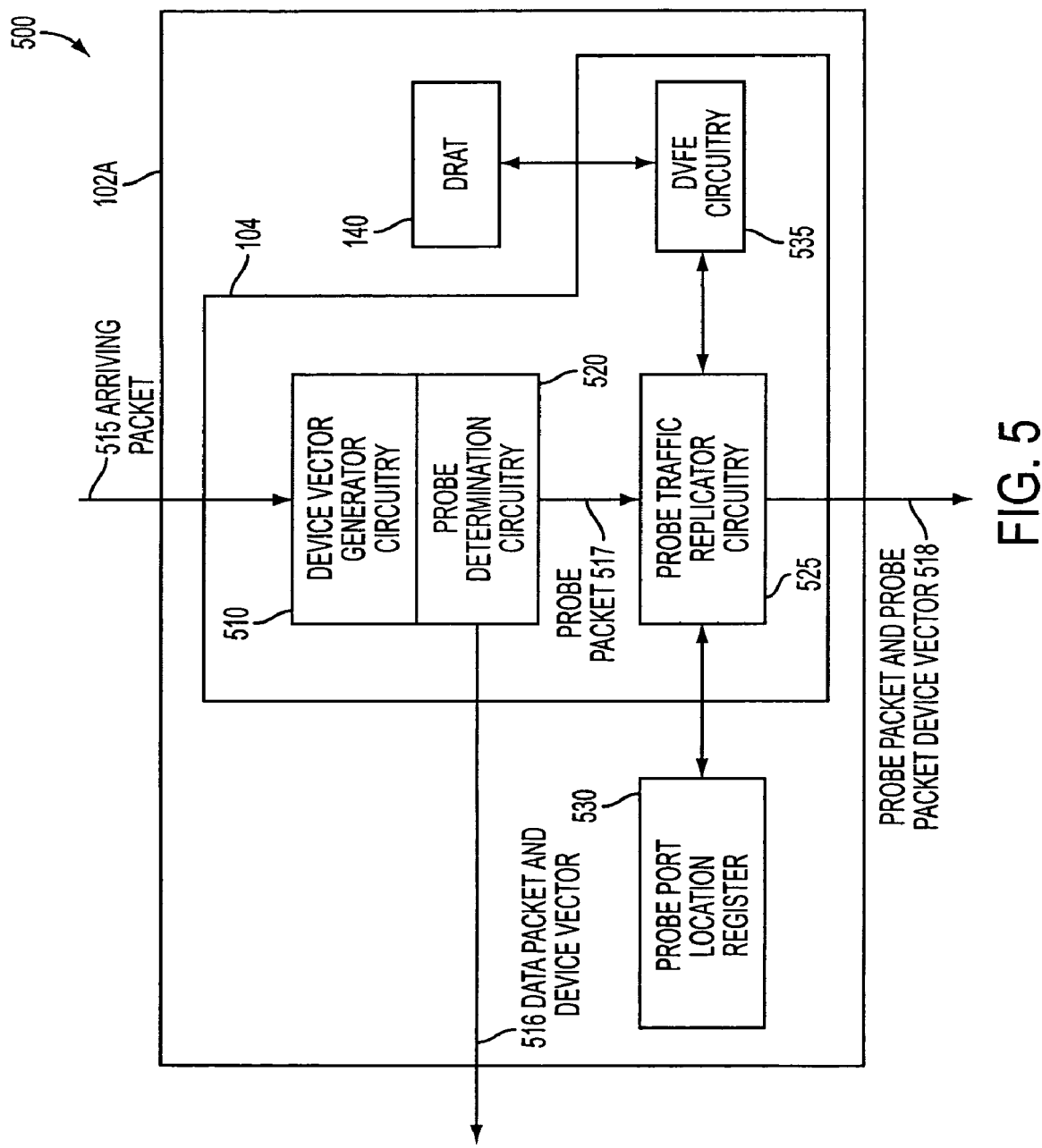
FIG. 5 is a block diagram of an exemplary switch according to an embodiment.

FIG. 5 is a block diagram 500 of the exemplary switch 102A according to one embodiment. As will be detailed below, integrated circuit 104 of this embodiment may be capable of determining if an arriving data packet may be probed. If an arriving data packet is to be probed, integrated circuit 104 may also be capable of generating at least one probe packet and at least one probe packet device vector and forwarding the probe packet and the probe packet device vector to one or more probe ports of one or more devices within a stack of switches. A "probe packet", as used in any embodiment herein, may be defined as a copy of a data packet and may include header information indicative of a probe packet status. A "probe packet device vector", as used in any embodiment herein, may be defined as a superset of symbols that may be used to route a probe packet through one or more devices in a stack of switch to reach one or more probe ports.

As an overview and with continued reference to FIG. 5 and the switch stack 200 of FIG. 2, the integrated circuit 104 of this embodiment may be capable of processing an arriving packet 502 to determine whether the arriving packet 502 should be probed. If the arriving packet 502 is to be probed, integrated circuit 104 may enable local probing which may cause integrated circuit 104 to forward the probe packet to one or more local probe ports comprised in switch 102A. Alternatively or additionally, in this embodiment, if switch 102A is positioned as an ingress device within a switch stack, then integrated circuit 104 may enable source probing which may cause integrated circuit 104 to forward one or more probe packets to one or more probe ports comprised in at least one other switch in the switch stack. The term "source probing" as used in any embodiment herein may be defined as probing determination and/or probe packet forwarding occurring at the ingress switch of a switch stack. Source probing may be based on, for example, a packet arriving from outside of a switch stack. Alternatively or additionally, in this embodiment, if switch 102A is positioned as an egress device within a switch stack, then integrated circuit 104 may enable destination probing which may cause integrated circuit to forward one or more probe packets to one or more probe ports comprised in at least one other switch in the switch stack. The term "destination probing" as used in any embodiment herein may be defined as probing determination and/or probe packet forwarding occurring at the egress switch of a switch stack. Alternatively or additionally, if switch 102A is positioned as an intermediate device, then integrated circuit 104 may enable probing that may operate similar to local probing, destination probing, and/or source probing, depending on, for example, where probe instruments may be connected.

The determination to probe the packet may be based on user-defined criteria, for example, but not limited to, incoming port, destination port, and/or other parameters in the data packet. If the arriving data packet 515 is not to be probed, integrated circuit 104 may forward the data packet 515 to one or more devices in the switch stack using, for example, device vector operations described above with reference to FIG. 4.

Integrated circuit 104 may comprise device vector generator circuitry 510 which may be capable of receiving an arriving data packet 515 (which may comprise a multicast data packet as described herein) and generating a device vector to route the data packet 515 to one or more switches and/or devices within the switch stack, in a manner described above with reference to FIG. 4. Integrated circuit 104 may also include probe determination circuitry 520 which may be capable of receiving the data packet 515 and determining if the data packet should be probed. If the data packet is to be probed, probe determination circuitry 520 may also be capable of replicating the data packet 515 to create a copy thereof, referred to herein as a "probe packet" 517. The unprobed data packet 516 may be forwarded to one or more devices in a stack of switches using a device vector transport mechanism (as described herein) via one or more stack ports of switch 102A. The probe packet 517 may be passed to probe traffic replicator circuitry 525, and the probe packet 517 may be routed to one or more probe ports in a manner described below.

Probe traffic replicator circuitry 525 which may be capable of receiving the probe packet 517 and either forwarding the packet to one or more probe ports (if one or more probe ports are local to switch 102A) and/or attaching a device vector to the probe packet 517 to route the probe packet one or more probe ports located in another device in the stack, via one or more stack ports. To that end, switch 102A may also include a probe port location register 530 which may include one or more entries of which devices include one or more probing instruments capable of probing a probe packet. Probe port location register 530 may contain one or more device numbers of one or more devices where one or more probing ports may reside. Data entries in the probe port location register 530 may be user-definable and/or maintained and/or updated via integrated circuit 104. Probe traffic replicator circuitry 525 may be capable of reading probe port location register 530 to determine which device, among a plurality of devices, to forward a probe packet to permit, for example, the probe packet to be probed.

Integrated circuit 104 may also include device vector forwarding engine (DVFE) circuitry 535 which may be capable of generating a probe packet device vector for the probe packet 517. As described above with reference to FIG. 4, DVFE circuitry 535 may be capable of reading the DRAT 140 to generate a probe packet device vector based on, at least in part, a probe port location as may be stored in probe port location register 530 and DRAT 140. Probe traffic replicator circuitry 525 may be capable of transmitting the probe packet and probe packet device vector 518 one or more stacked ports of switch 102A to route the probe packet through one or more devices in a stack to reach one or more probe ports located in one or more switches in the stack.

Figure 6:
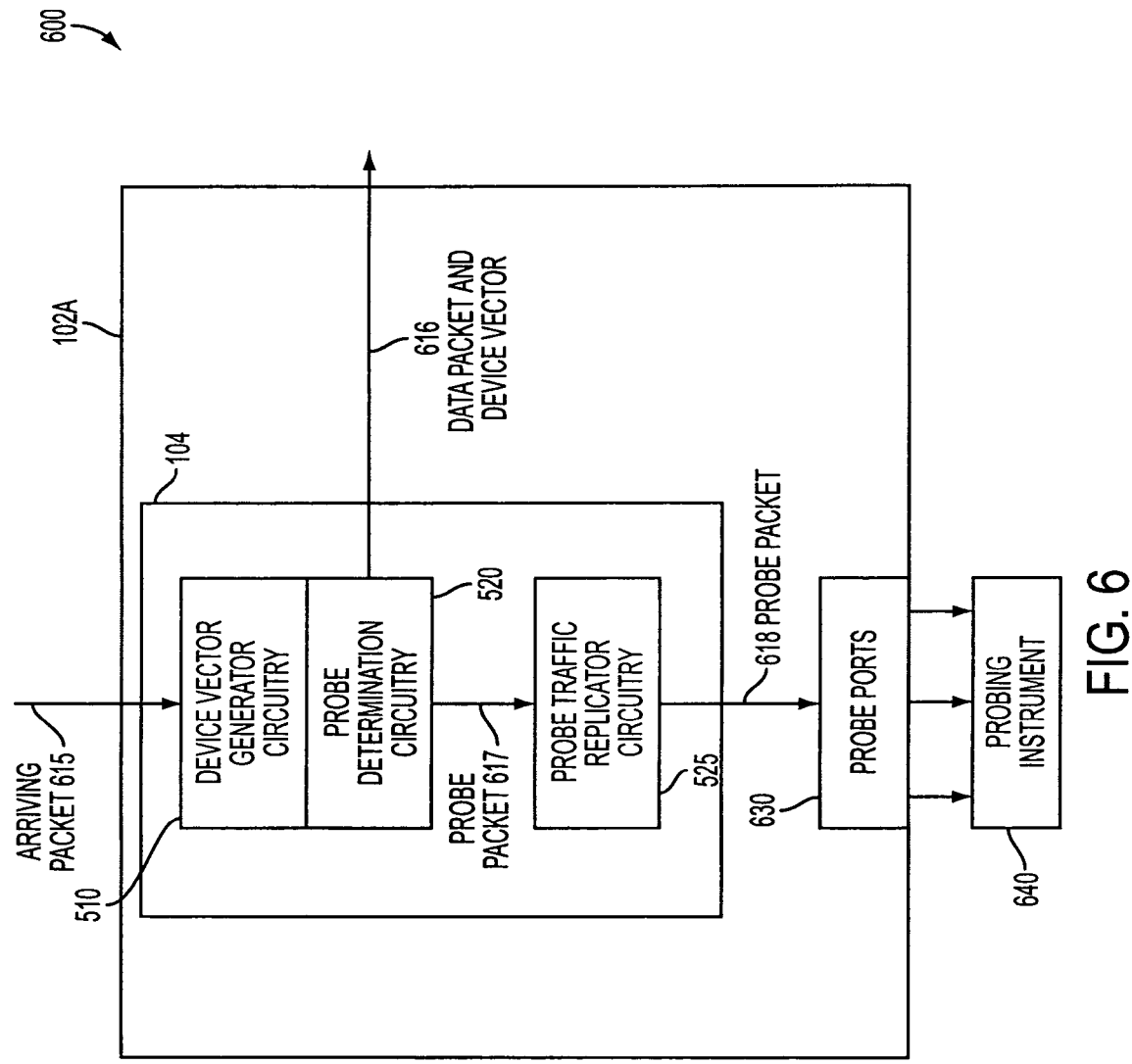
FIG. 6 is a block diagram of another exemplary switch according to another embodiment.

FIG. 6 is a block diagram 600 of another exemplary embodiment of switch 102A. In this embodiment, switch 102A may include one or more local probe ports 630, and one or more probing instruments 640 may be coupled to one or more local probe ports 630. In this exemplary embodiment, integrated circuit 104 may be capable of local probing. Although this embodiment depicts local probing, switch 102A may be an ingress device, an egress device, or another device within the switch stack capable of making a probing determination. The operation of device vector generator circuitry 510 and probe determination circuitry 520 may operate in the manner described above with reference to FIG. 5 and may generate a probe packet 617. In this embodiment, since one or more probing instruments may be coupled locally to switch 102A via one or more probe ports 630, probe traffic replicator circuitry 525 may be capable of a replicated probe packet 618 directly to one or more probe ports 630, for example, without a probe packet device vector. In at least one embodiment, a plurality of ports (for example probe ports 630) may be aggregated together. Aggregation of ports may provide, for example, load balancing among a plurality of probe ports, which may operate to increase data throughput and overall bandwidth of the system.

Figure 7:
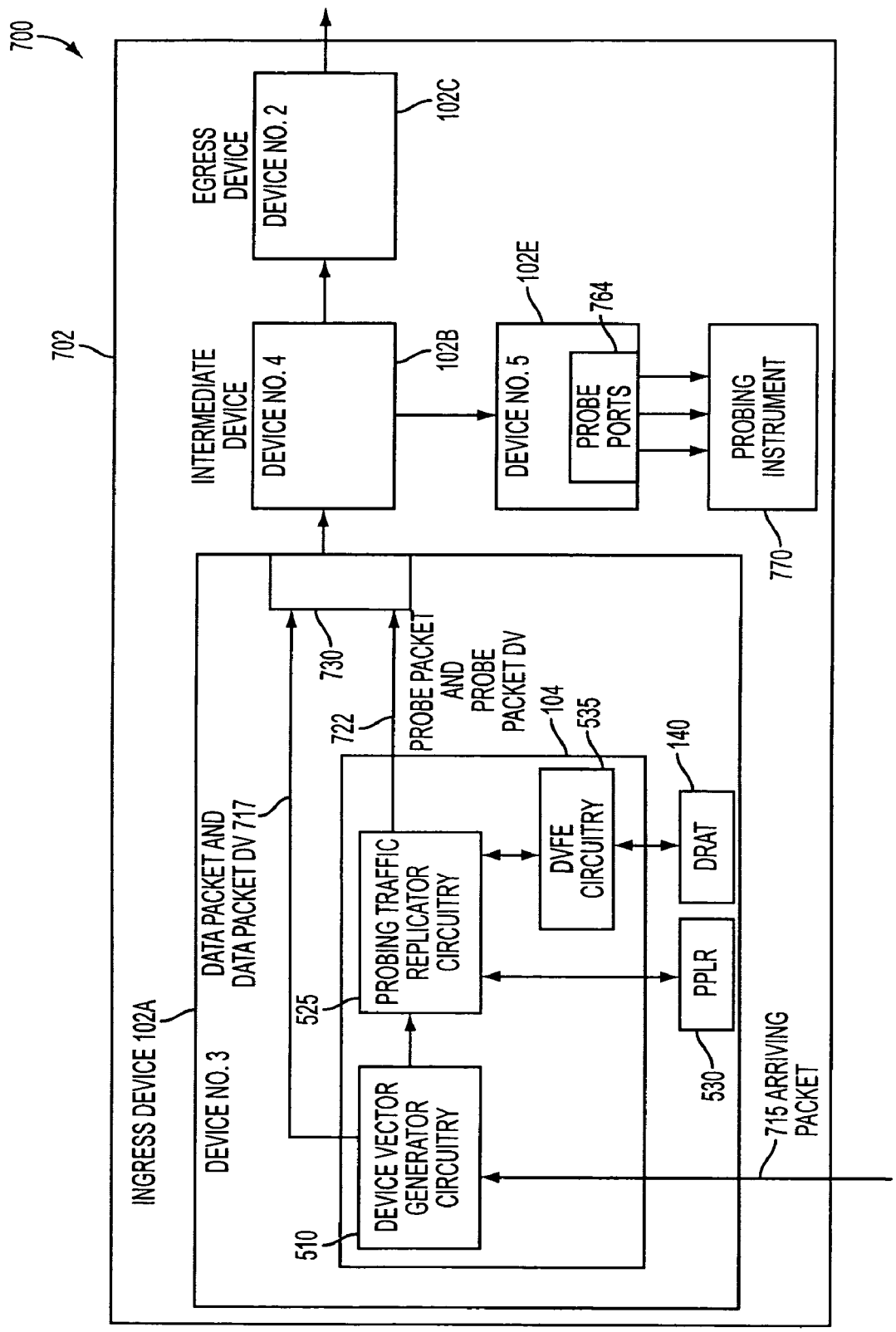
FIG. 7 is a block diagram of an exemplary switch and exemplary switch stack according to an embodiment.

FIG. 7 depicts a block diagram 700 of an exemplary switch stack 702. In this embodiment, switch 102A may comprise an ingress device which may operate to provide source probing, and switch 102A of this embodiment may be considered an alternative embodiment to the embodiments of FIGS. 5 and/or 6. Switch 102A may comprise integrated circuit 104, and exemplary operations of the device vector generator circuitry 510, probing traffic circuitry 525 DVFE circuitry 535, and the PPLR 530 and DRAT 140 described above may be incorporated into this embodiment. In this embodiment, device vector generator circuitry 510 may receive an arriving data packet 715 and create a device vector for the data packet. The device vector and the data packet 716 may be forwarded to one or more devices using, for example, one or more stacked ports 730. Additionally, in this embodiment, device vector generator circuitry 510 may forward the data packet 715 to probing traffic replicator circuitry 525 to generate a probe packet and probe packet device vector 722, as described above.

The probe packet and probe packet device vector may be forwarded to one or more devices via one or more stacked ports 730. In this example, Device No. 5 (760) may include one or more probe ports 764 and one or more probing instruments 770 coupled thereto. The probe packet device vector may operate to route the probe packet from switch 102A, through Device No. 4 (740) (which may comprise, for example, an intermediate device) to Device No. 5 (760). Also, in this example, the data packet 717 may be routed through Device No. 4 to Device No. 2 (750).

Figure 8:
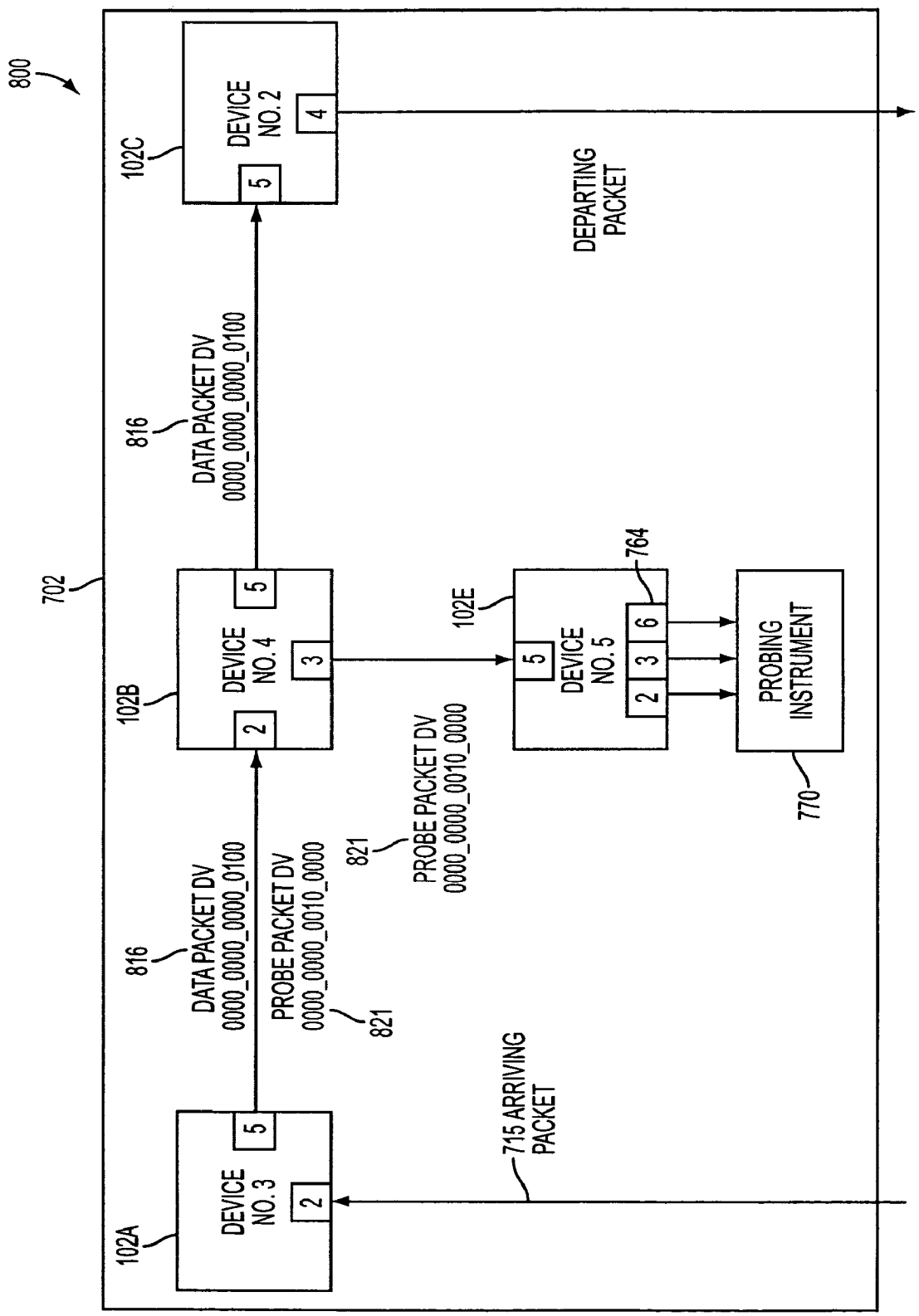
FIG. 8 is a block diagram illustrating a packet flow for the embodiment of FIG. 7.

FIG. 8 is a block diagram 800 illustrating, among other things, probe packet device vector operations and probe packet routing through the exemplary switch stack 702 of the embodiment of FIG. 7. The details of switch 102A of the embodiment of FIG. 7 have been omitted for clarity, and thus, this embodiment makes continued reference to FIG. 7. In this exemplary embodiment, probe ports 764 may reside in Device No. 5 (102E). A data packet 715 may arrive at port 2 of Device No. 3 (102A). Device vector generator circuitry 510 may generate a data packet device vector 816 and transmit the data packet and the data packet device vector 816 to stack port 2 of Device No. 4 (102B), via stack port 5. Device vector 816 may be of the form 0000_0000_0000_0100, which may indicate that the data packet is destined for Device No. 2 (i.e., bit 2 is set). Device No. 4 (102B) may forward the data packet to port 5 of Device No. 2 in a similar manner.

As described above, the probing traffic replicator circuitry 525 may replicate the data packet and create a probe packet. Also as described above, DVFE circuitry may create a probe packet device vector 821 of the form 0000_0000_0010_0000, which may indicate that the probe packet is destined for Device No. 5. The probe packet, along with the probe packet device vector may be routed through Device No. 4 to reach Device No. 5. Of course, this is only an example of source probing and the present disclosure is not limited to just this example.

Figure 9:
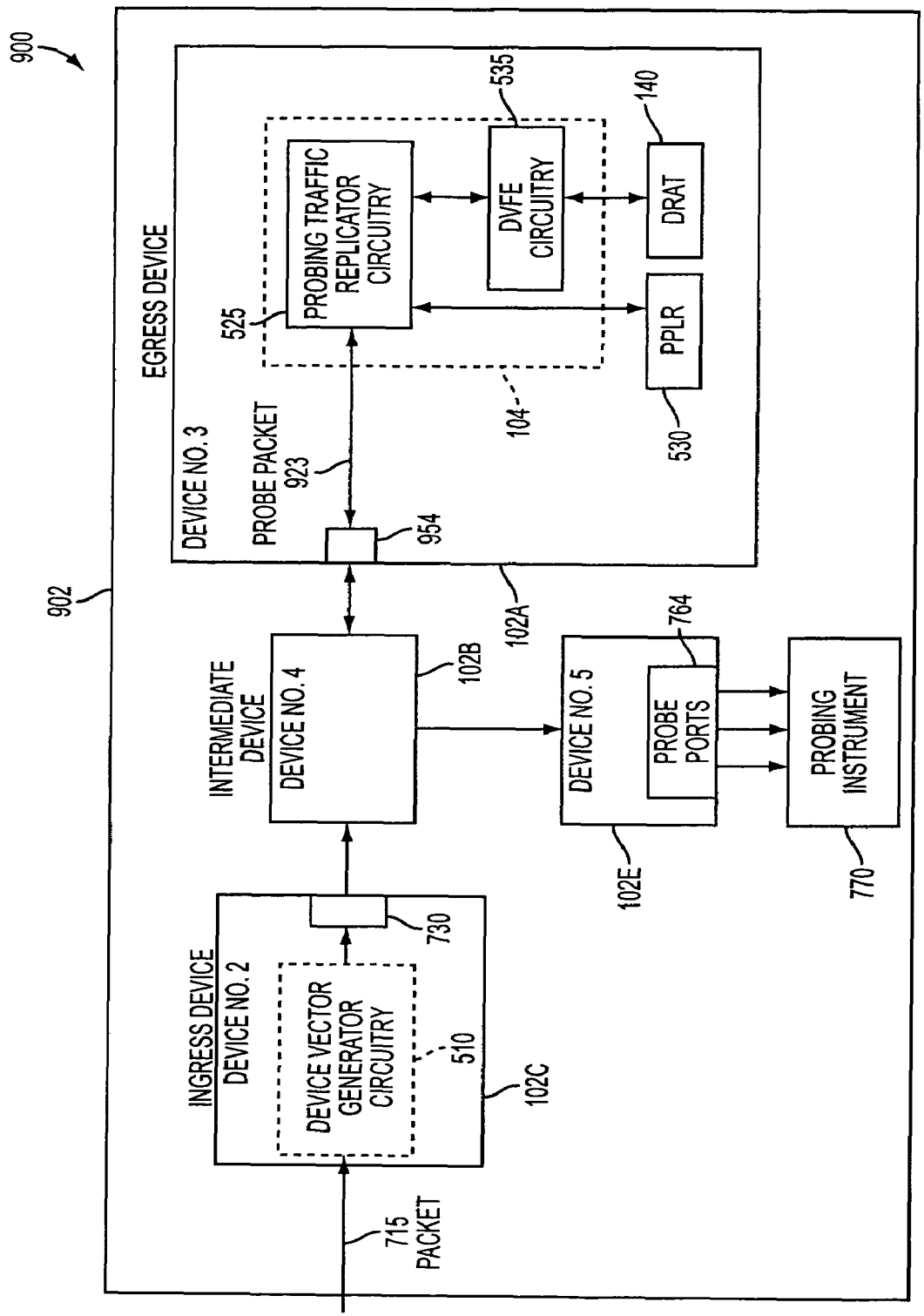
FIG. 9 is a block diagram of another exemplary switch and exemplary switch stack according to an embodiment.

FIG. 9 depicts a block diagram 900 of an exemplary switch stack 902. In this embodiment, switch 102A may comprise an egress device which may operate to provide destination probing, and switch 102A of this embodiment may be considered an alternative embodiment to the embodiments of FIGS. 5, 6, 7 and/or 8. Switch 102A may comprise integrated circuit 104, and exemplary operations of the device vector generator circuitry 510, probe traffic replicator circuitry 525, DVFE circuitry 535, and the PPLR 530 and DRAT 140 described above may be incorporated into this embodiment. In this embodiment, Device No. 2 may receive a data packet 715 and Device No. 2 may comprise device vector generator circuitry 510 (which may be embodied as integrated circuit 104) operable to route the data packet 715 to Device No. 3, via Device No. 4.

Device No. 3 may receive a data packet, for example from another device in the stack 902. Probe traffic replicator circuitry 525 may receive an arriving data packet a probe packet and probe packet device vector 722, as described above. The probe packet and probe packet device vector may be forwarded to one or more devices via one or more stacked ports 954. In this example, Device No. 5 (760) may include one or more probe ports 764 and one or more probing instruments 770 coupled thereto. The probe packet device vector may operate to route the probe packet from switch 102A, through Device No. 4 (740) (which may comprise, for example, an intermediate device) to Device No. 5 (760). Also, in this example, the data packet 717 may be routed through Device No. 4 to Device No. 2 (750).

Figure 10:
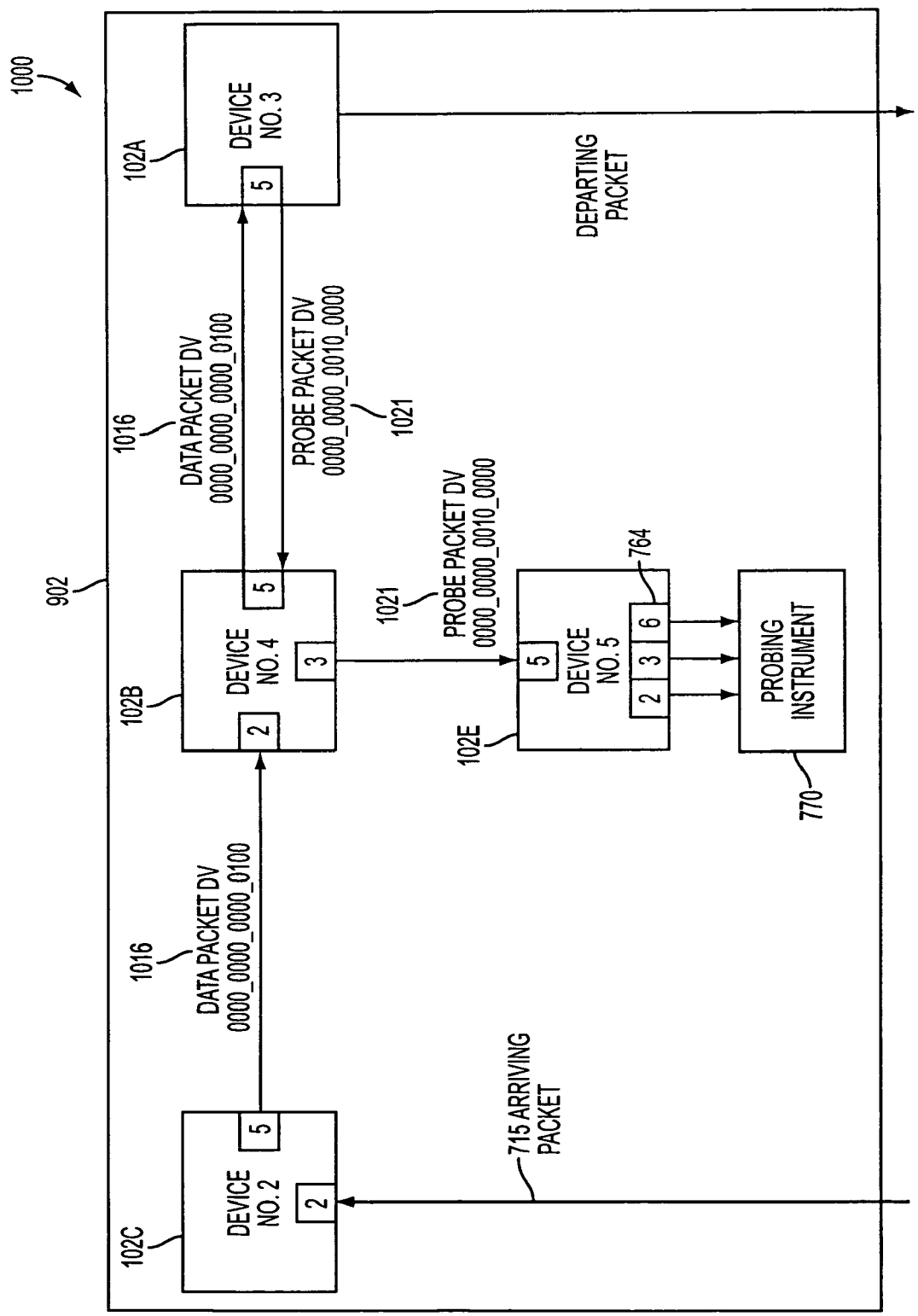
FIG. 10 is a block diagram illustrating a packet flow for the embodiment of FIG. 9.

FIG. 10 is a block diagram 1000 illustrating, among other things, probe packet device vector operations and probe packet routing through the exemplary switch stack 902 of the embodiment of FIG. 9. The details of switch 102A of the embodiment of FIG. 9 have been omitted for clarity, and thus, this embodiment makes continued reference to FIG. 9. In this exemplary embodiment, probe ports 764 may reside in Device No. 5 (102E). As described above, the probe traffic replicator circuitry 525 may replicate a data packet and create a probe packet. Also as described above, DVFE circuitry may create a probe packet device vector 1021 of the form 0000_0000_0010_0000, which may indicate that the probe packet is destined for Device No. 5. The probe packet, along with the probe packet device vector may be routed through Device No. 4 to reach Device No. 5. Of course, this is only an example of source probing and the present disclosure is not limited to just this example.

Figure 11:
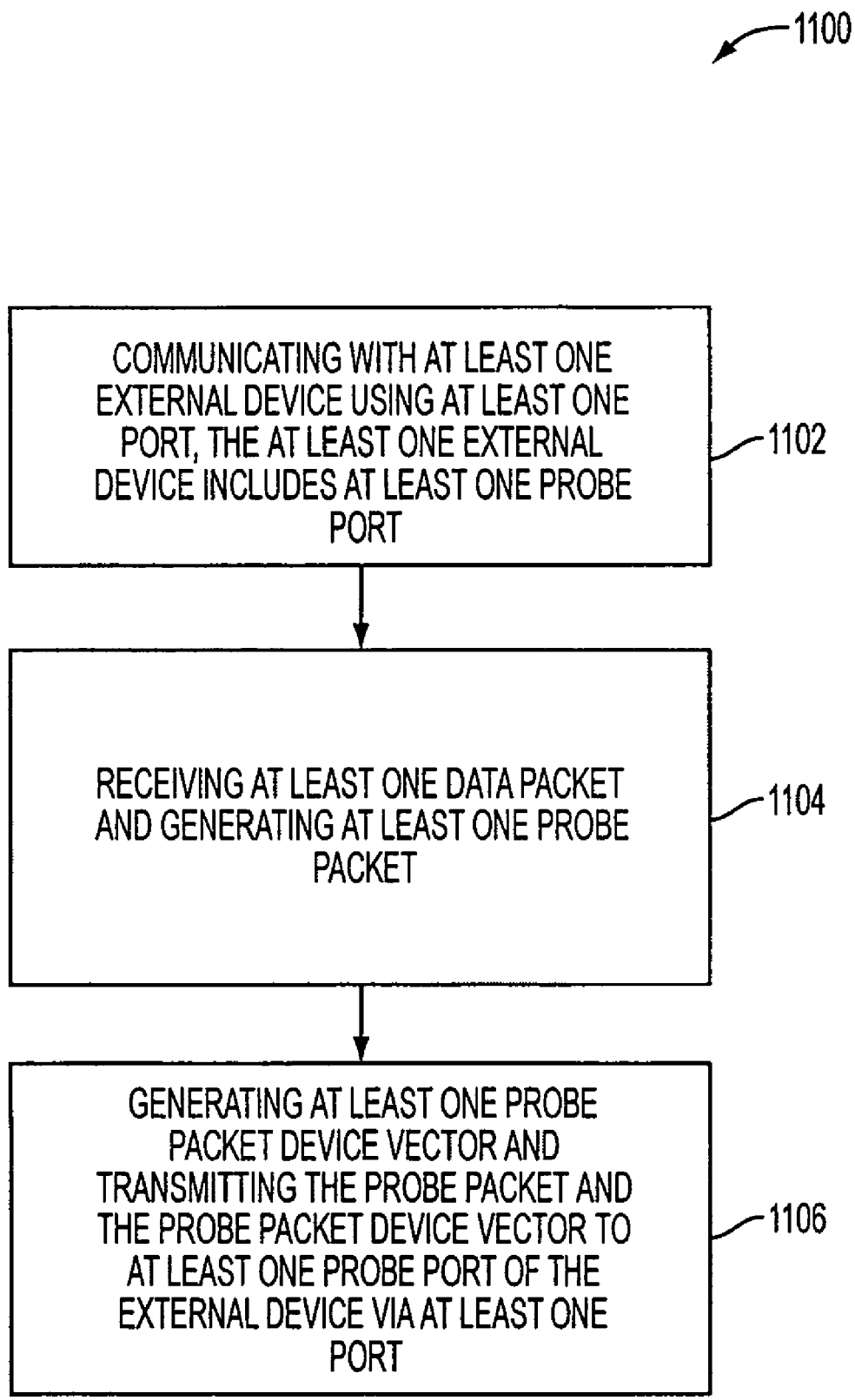
FIG. 11 is a flow chart illustrating exemplary operations according to an embodiment.

FIG. 11 illustrates exemplary operations 1100 that may be performed according to an embodiment. Operations may also include communicating with at least one external device using at least one port, wherein said at least one external device comprises at least one probe port 1102. Operations may also include receiving at least one data packet and generating at least one probe packet, 1104. Operations may further include generating at least one probe packet device vector and transmitting the probe packet and the probe packet device vector to at least one probe port of the external device via at least one port 1106.

Additionally, or alternatively, a commit bit may be included in a header portion of the probe packet. A commit bit may enable more reliable transmission and routing of a probe packet by forcing one or more devices receiving the probe packet to drop the probe packet only after other data packets are dropped. The commit bit may set at the ingress device to the switch stack, and may be set to reserve bandwidth in one or more intermediate devices (e.g., Device Nos. 1 102D, 4 102B, and 5 102E in FIG. 2) carrying probe packets. While embodiments disclosed above describe probe determination at the ingress and egress devices of a switch stack, it should be noted that the disclosure equally contemplates probe determination at any point in the switch stack.

Thus, in summary, one apparatus embodiment may include an integrated circuit capable of communicating with at least one external device using at least one port, wherein said at least one external device comprises at least one probe port. The integrated circuit may also be capable of receiving at least one data packet and generating at least one probe packet. The integrated circuit may further be capable of generating at least one probe packet device vector and transmitting the probe packet and the probe packet device vector to at least one probe port of at least one external device via at least one port.

At least one system embodiment may include a switch capable of communicating with at least one external device using a plurality of ports. The switch may include an integrated circuit capable of communicating with at least one external device using at least one port, wherein said at least one external device comprises at least one probe port. The integrated circuit may also be capable of receiving at least one data packet and generating at least one probe packet. The integrated circuit may further be capable of generating at least one probe packet device vector and transmitting the probe packet and the probe packet device vector to at least one probe port of at least one external device via at least one port.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus, comprising:
an integrated circuit configured for communicating with at least one external device using at least one port, wherein said at least one external device comprises at least one probe port, the integrated circuit is also configured for receiving at least one data packet and generating at least one probe packet, the integrated circuit is also configured for generating at least one probe packet device vector and transmitting the probe packet and the probe packet device vector to at least one said probe port of said external device via said at least one port;
the integrated circuit comprises device vector forwarding engine circuitry configured for reading a device reachability table and at least one probe port location register, and of generating said probe packet device vector, the device reachability table comprising one or more data entries indicating which port among a plurality of ports is used by the integrated circuit to forward the probe packet to the at least one external device, and the probe port location register comprising one or more data entries indicating the one or more external devices comprising the probe ports.

2. The apparatus of claim 1, wherein:
the integrated circuit further comprises device vector generator circuitry configured for generating at least one device vector based at least in part on said data packet.

3. The apparatus of claim 1, wherein:
the integrated circuit further comprises probe determination circuitry capable of configured for determining said data packet is to be probed.

4. A method, comprising:
communicating with at least one external device using at least one port, said at least one external device comprises at least one probe port;
receiving at least one data packet and generating at least one probe packet;
generating at least one probe packet device vector and transmitting the probe packet and the probe packet device vector to at least one said probe port of said external device via said at least one port;
reading one or more data entries from a device reachability table to determine which port among a plurality of ports is used by an integrated circuit to forward said probe packet to the at least one external device; and
reading one or more data entries from a probe port location register to determine the one or more external devices comprising the probe ports.

5. The method of claim 4, further comprising:
generating at least one device vector based at least in part on said data packet.

6. The method of claim 4, further comprising:
determining said data packet is to be probed.

7. A computer-readable medium encoded with computer-executable instructions that when executed by a computer result in the following operations comprising:
communicating with at least one external device using at least one port, said at least one external device comprises at least one probe port;
receiving at least one data packet and generating at least one probe packet;
generating at least one probe packet device vector and transmitting the probe packet and the probe packet device vector to at least one said probe port of said external device via said at least one port;
reading one or more data entries from a device reachability table to determine which port among a plurality of ports is used by an integrated circuit to forward said probe packet to the at least one external device; and
reading one or more data entries from a probe port location register to determine the one or more external devices comprising the probe ports.

8. The computer-readable medium of claim 7, wherein said instructions that when executed by said computer result in the following additional operations:
generating at least one device vector based at least in part on said data packet.

9. The computer-readable medium of claim 7, wherein said instructions that when executed by said computer result in the following additional operations:
determining said data packet is to be probed.

10. A system, comprising:
a switch configured for communicating with at least one external device using a plurality of ports, and an integrated circuit configured for communicating with at least one external device using at least one port, wherein said at least one external device comprises at least one probe port, the integrated circuit is also configured for receiving at least one data packet and generating at least one probe packet, the integrated circuit is also configured for generating at least one probe packet device vector and transmitting the probe packet and the probe packet device vector to at least one said probe port of said at least one external device via said at least one port;
the integrated circuit further comprises device vector forwarding engine circuitry configured for reading a device reachability table and at least one probe port location register, and of generating said probe packet device vector, the device reachability table comprising one or more data entries indicating which port among a plurality of ports is used by the integrated circuit to forward the probe packet to the at least one external device, and the probe port location register comprising one or more data entries indicating the one or more external devices comprising the probe ports.

11. The system of claim 10, wherein:
the integrated circuit further comprises device vector generator circuitry configured for generating at least one device vector based at least in part on said data packet.

12. The system of claim 10, wherein:
the integrated circuit further comprises probe determination circuitry configured for determining said data packet is to be probed.

* * * * *